Oct. 28, 1941.  S. RUBEN  2,260,758

VOLTAGE CONVERTER TUBE

Original Filed Nov. 21, 1935

Inventor
Samuel Ruben

By Lyman E. Dodge
Attorney

Patented Oct. 28, 1941

2,260,758

UNITED STATES PATENT OFFICE 2,260,758

VOLTAGE CONVERTER TUBE

Samuel Ruben, New Rochelle, N. Y., assignor to Oscar A. Ross, New York, N. Y.

Original application November 21, 1935, Serial No. 50,901. Divided and this application October 20, 1939, Serial No. 300,295

3 Claims. (Cl. 171—97)

This invention relates to combined interrupter rectifier devices for interrupting and rectifying electric currents and is a division of S. N. 50,901, filed November 21, 1935, Patent Number 2,192,506 issued March 5, 1940, entitled "Voltage converter tube."

An object of the invention is to improve an interrupter rectifier device.

Another object is to provide an interrupter and rectifier device which is adapted to cause periodic variations in an electric current flowing in a circuit and to rectify current flowing in a circuit.

A further object is to produce an improved voltage converter whereby electric circuit potentials can be raised to values higher than those supplied by the potential source.

A further object is to provide an interrupter rectifier unit having some of its parts common to both the interrupter and the rectifier.

Further objects of the invention are to reduce mechanical noises resulting from operation of an interrupter, to prevent wear and oxidation of the interrupter contacts, and to achieve economical manufacture and operation of an interrupter rectifier unit.

Further objects of the invention will be better understood by reference to the following specification and claims and illustrations in the accompanying drawing, in which:

Figure 1:
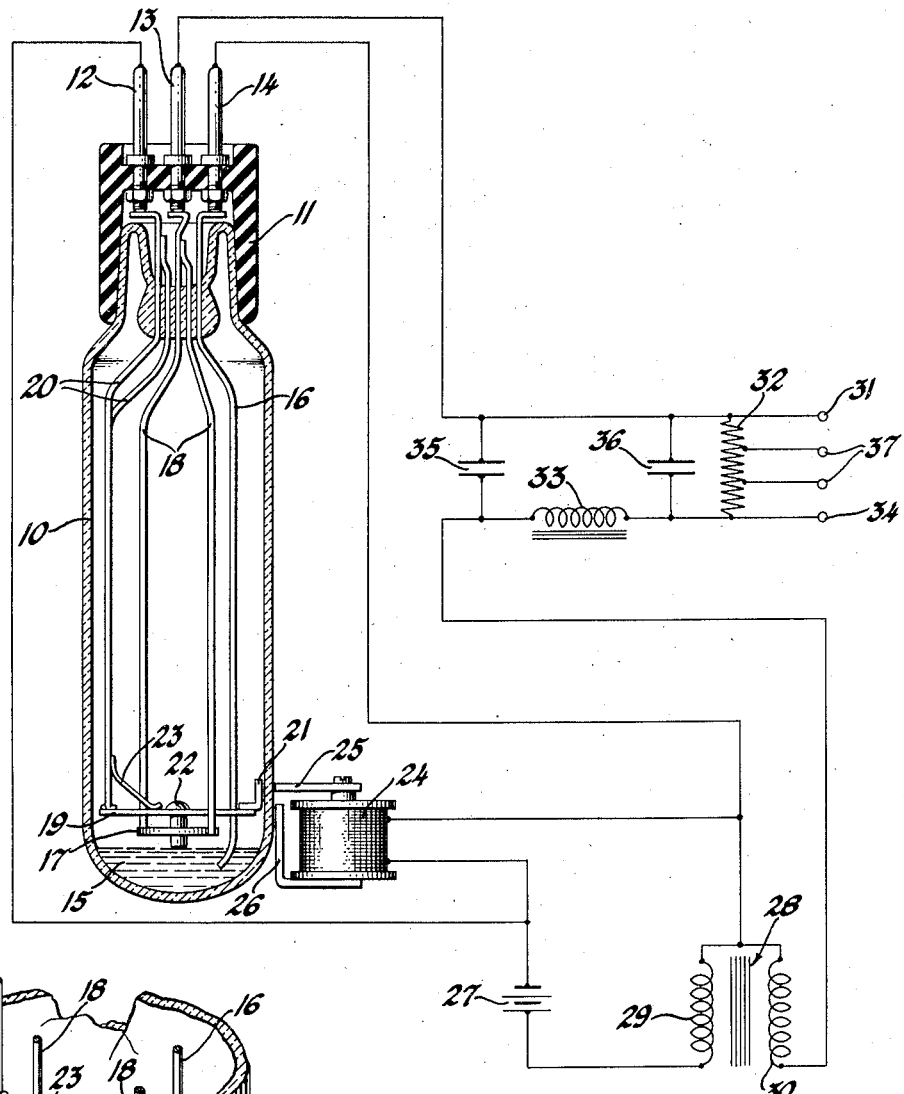
Figure 1 is a vertical section through a voltage converter tube embodying features of the present invention, together with a diagram of a circuit suitable for use with the tube.
Figure 2:
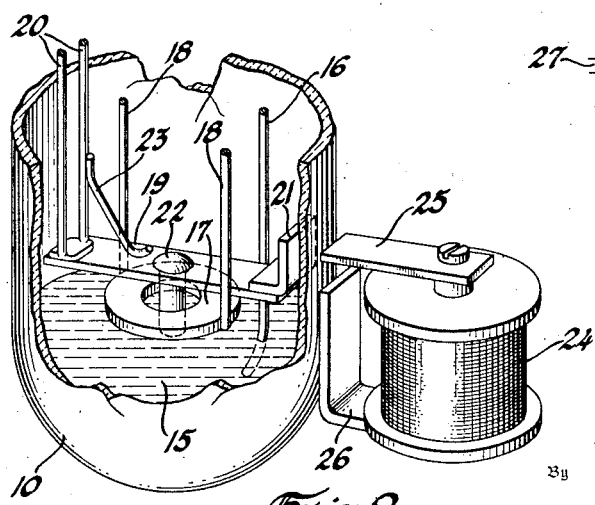
Figure 2 is an enlarged perspective view of certain of the operating parts of the tube and associated structure.

Referring to the drawing, the voltage converter unit shown therein comprises an evacuated glass envelope 10 provided with a mounting base 11 of conventional form provided with prongs 12, 13 and 14 for connecting the elements of the unit to an external circuit by fixing it in an ordinary socket, not shown. The unit is preferably mounted with its base 11 at the upper end so that a quantity of mercury 15 will form a pool at the lower end of the tube 10 which will then be opposite base 11 in its normal operating position. A conductor 16 is connected to prong 14 and then passes through the wall of the envelope 10 and extends downward, dipping into the mercury pool 15 at its lower end to provide a circuit connection to the mercury.

Also within the lower portion of the glass envelope is supported a metal ring electrode 17 by conductors 18 which extend through the metal envelope and support the electrode 17 slightly above the surface of the mercury pool. Conductors 18 also extend through the wall of the envelope 10 and are connected to prong 13 of the base member. A flat metal spring 19, preferably of tungsten, is also mounted within the tube 10 slightly above the ring member 17 and parallel thereto. Spring 19 is supported by conductors 20 which lie parallel with conductors 16 and 18 and extend through the wall of the envelope to be connected to prong 12 of the base. All of these conductors 16, 18 and 20 are sealed within the wall of the glass envelope 10 adjacent the base member 11. The flat metal spring 19 carries at its outer end an iron armature 21. A rod 22, preferably of tungsten, is mounted on the under side of spring 19 near its central portion and passes downward through the central hole in the ring electrode 17, but is normally out of contact with the mercury pool 15. A tungsten spring 23 is also mounted on one of the supporting conductors 20 with its upper end positioned close to the upper surface of spring 19 so that it may act as a stop to prevent excessive oscillation of the armature spring 19. An electromagnet 24 is mounted outside of the tube 10 and adjacent to the electrode location, as described above, by any suitable means and is provided with a pair of spaced pole members 25 and 26 immediately adjacent to the armature 21 so that energization of the electromagnet 24 will cause the poles thereof to draw armature 21 toward the lower end of the tube or toward the mercury pool.

In the circuit shown in connection with this tube 27 is a battery and one of its ends is connected to prong 12 of the base 11, the same line also being connected to one terminal of the electromagnet 24. The other terminal of the battery 27 is connected to one end of the primary winding 29 and transformer 28. The other end of the primary winding 29 is directly connected to prong 14 of the base and also to the opposite terminal of the electromagnet 24. Prong 13 is connected directly to terminal 31 of the output circuit to which is connected one end of a voltage dividing resistor 32 in the output circuit. The secondary winding 30 of the transformer 28 has one of its ends connected to prong 14 and the other end connected through choke coil 33 to output terminal 34 at the opposite end of the resistor 32. A pair of condensers 35 and 36 are connected across the output circuit on both sides of the choke coil 33 so that they form, together with the choke coil, a filter circuit for suppressing undesirable oscillations in the output circuit.

In the operation of this system shown in Figure 1, the current from the battery 27 passes through the winding of the electromagnet 24 and transformer primary winding 29 in series. Since the winding of electromagnet 24 is of comparatively high resistance, the current intensity is comparatively small, but is sufficient to magnetize the electromagnet and cause the poles thereof to attract armature 21 which is mounted on spring 19 inside the tube. The attraction of armature 21 causes contact 22 to dip into the mercury bath 15, thereby short-circuiting electromagnet 24 and allowing a greater amount of current to flow in the primary winding 29 of the transformer. The short-circuiting of electromagnet 24 removes the attraction of the electromagnet for the armature and armature 21 therefore springs back and pulls contact 22 out of the mercury bath 15. The breaking of the contact with the mercury produces an arc at the point of break and ionizes the atmosphere between the ring electrode 17 and the mercury bath, thereby providing a low impedance unilaterally conductive path between this electrode and the mercury bath through the mercury vapor. The change in current in the primary winding 29 caused by the break in contact with the mercury results in a high induced E. M. F. across the secondary winding 30 of the step-up transformer 28. This high E. M. F. produces a current in the secondary circuit which current is rectified by the uni-laterally conductive atmosphere between the mercury bath 15 and the ring electrode 17, which electrodes are in series with the secondary winding 30 as will be easily identified from the drawing. The rectified current passes through the dividing resistor 32 and choke coil 33 in the output circuit so that a high direct current potential is applied between terminals 31 and 34. It will be obvious that low potentials can be obtained by tapping resistor 32 at various points as is indicated by terminals 37.

While mercury has been described as the preferred arc-producing body, other materials may in some instances be used such as amalgams of mercury with other metals; for instance, with sodium and potassium. The type of atmosphere or degree of vacuum used can be adjusted to be suitable for the electrode material and electrode circuit conditions desired to be used.

While the present invention, as to its objects and advantages, has been described herein as carried out in specific embodiments thereof, it is not desired to be limited thereby but it is intended to cover the invention broadly within the spirit and scope of the appended claims.

I claim:

1. In a voltage converter system, a source of current and a first circuit fed thereby, a second circuit and transformer means associated with both said circuits for supplying energy from said source to said second circuit, interrupter means in said first circuit and rectifier means in said second circuit, said interrupter means comprising a contact and a pool of mercury and said rectifier means comprising said pool of mercury and an electrode spaced therefrom, and means for dipping said contact into said mercury and withdrawing it therefrom whereby said contact causes interruptions in said first circuit and also serves to start a discharge to said rectifier electrode.

2. In a voltage converter, a transformer, a primary and a secondary circuit connected thereto, a low voltage source connected in the primary circuit, a pool of mercury, an electrode common to both primary and secondary connected to the mercury pool, an electrode mounted in spaced relation to the mercury but capable of relative movement with respect thereto, magnetic means in series with the primary circuit mounted adjacent the movable electrode to cause it to engage the mercury, said primary current being limited by the magnetic means and the transformer primary in series to a comparatively low value but sufficient to cause a magnetic field which will attract the electrode, said electrode connected in parallel with the magnetic means and therefore causing a shorting out of the same when it contacts the mercury to cause a rapid rise in the primary current and reduction in magnetism to release the movable electrode and break its circuit again which provides a pulsating primary current and a high secondary current, and a relatively fixed spaced electrode mounted above the mercury pool and connected in series with the secondary whereby mercury vapor present between the electrode and the pool will act as a rectifier for the secondary circuit and provide a direct current therein.

3. In a voltage converter system, a source of current and a first circuit fed thereby, a second circuit and transformer means associated with both said circuits for supplying energy from said source to said second circuit, interrupter means in said first circuit and rectifier means in said second circuit, said interrupter means comprising a contact and a pool of mercury and said rectifier means comprising said pool of mercury and an electrode spaced therefrom, and magnetic means connected in said first circuit for dipping said contact into said mercury and withdrawing it therefrom whereby said contact causes interruptions in said first circuit and also serves to start a discharge to said rectifier electrode.

SAMUEL RUBEN.